Nov. 27, 1962 — C W. MUSSER — 3,065,645
OSCILLATING MOTION TRANSMITTING DEVICE
Filed Dec. 10, 1958 — 3 Sheets-Sheet 1

INVENTOR
C Walton Musser
BY
ATTORNEYS

Nov. 27, 1962  C W. MUSSER  3,065,645
OSCILLATING MOTION TRANSMITTING DEVICE
Filed Dec. 10, 1958  3 Sheets-Sheet 2
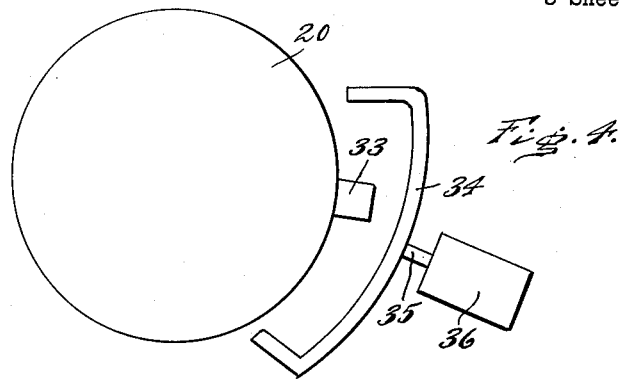
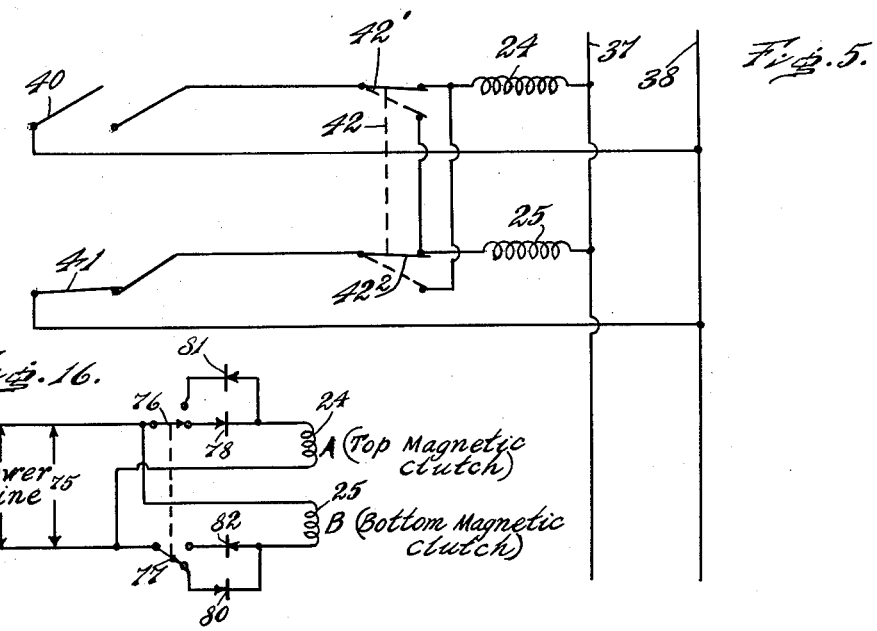
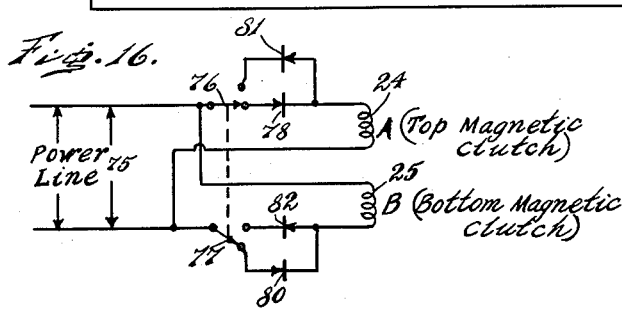
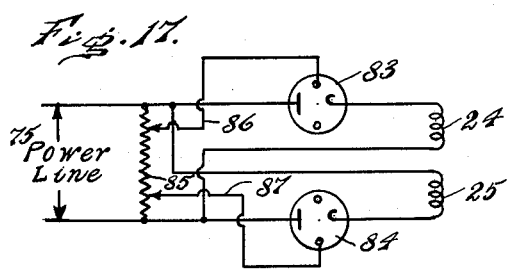
INVENTOR
C Walton Musser
BY
ATTORNEYS.

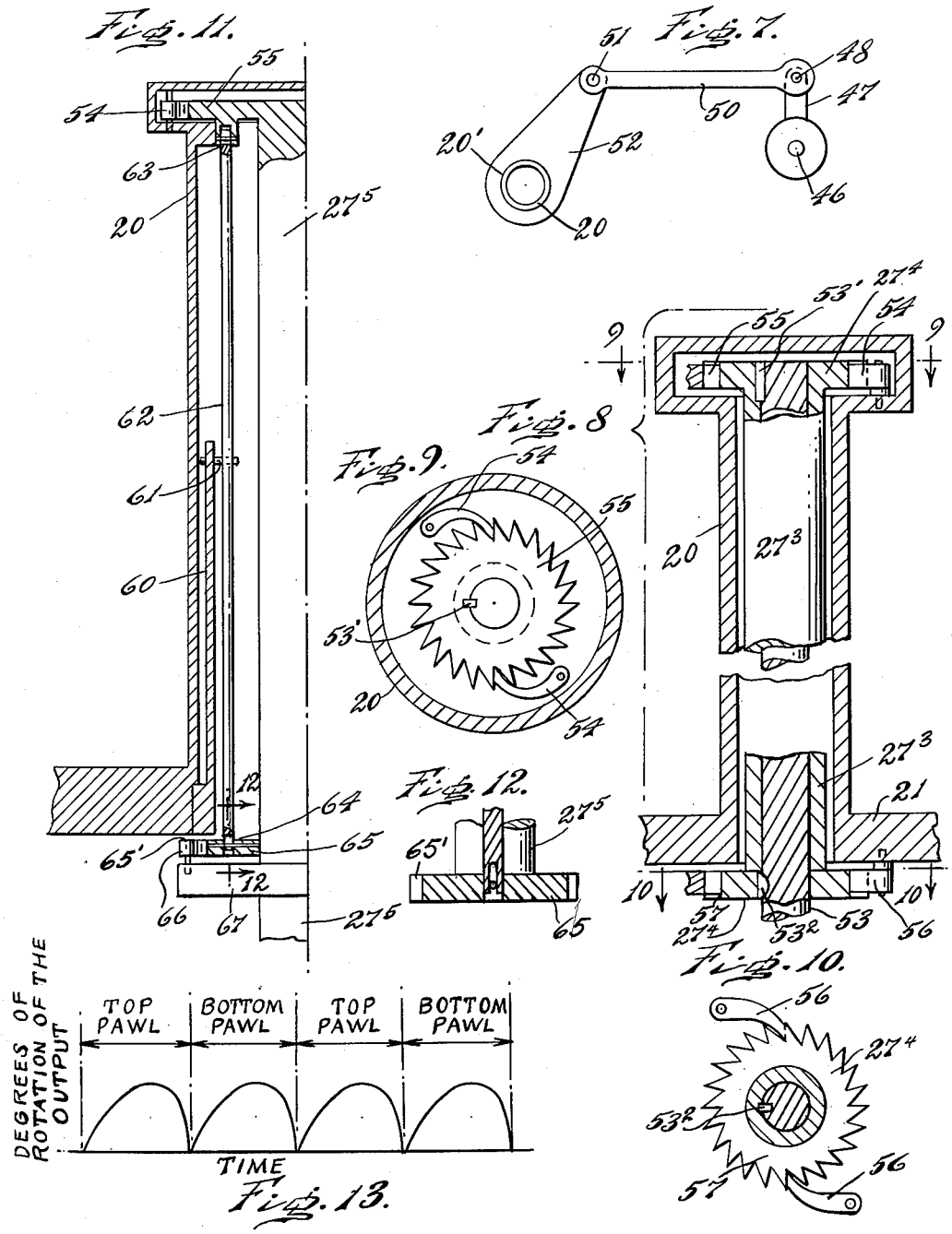

3,065,645
OSCILLATING MOTION TRANSMITTING DEVICE
C Walton Musser, Beverly, Mass., assignor to United Shoe Machinery Corporation, Boston, Mass., a corporation of New Jersey
Filed Dec. 10, 1958, Ser. No. 779,444
13 Claims. (Cl. 74—127)

The present invention relates to mechanism for transmitting motion, particularly mechanism for transmitting motion through sealed walls.

A purpose of the invention is to transmit motion through the sealed wall of a vessel, container, pipe or the like, such motion being either rotational or linear.

A further purpose is to employ torsional strain in a torque tube to transmit motion through a sealed wall.

A further purpose is to obtain reliable, accurate and trouble-free operation of mechanism inside the sealed wall of a container.

A further purpose is to convert rotary motion or oscillatory motion into linear motion.

A further purpose is to anchor one portion of a torque tube and oscillate another portion of the torque tube about its axis, to extend an output element through the torque tube and to provide ratchet or clutch connection between the torque tube and the output element at a relatively stationary position along the torque tube in one half-cycle and at a relatively oscillating position of the torque tube on another half-cycle.

A further purpose is to make the output element function as a nut, and to take off linear motion by a screw operating in the nut.

A further purpose is to bias the torque tube at the point of oscillation toward its neutral position.

A further purpose is to increase the inertia of the torque tube at the point of oscillation by adding to the mass through interconnection with a flywheel or other suitable inertia device.

A further purpose is to secure full wave interconnection between the torque tube and the output element.

A further purpose is to synchronize the correlating motion of an oscillating element with the frequency of the alternating current which provides the driving force.

Further purposes appear in the specification and in the claims.

FIGURE 4 is an end elevation showing a switch operator connected with the torque tube.

FIGURE 5 is an electrical diagram showing the circuit of the switch and magnetic clutches.

FIGURE 7 is a diagrammatic end elevation showing a variant embodiment of the invention in which the torque is oscillated mechanically.

FIGURE 8 is a fragmentary axial section showing a modified form of the device of the invention in which mechanical ratchets are provided between the torque tube and the output element.

FIGURE 9 is a section on the line 9—9 of FIGURE 8.

FIGURE 10 is a section on the line 10—10 of FIGURE 8.

FIGURE 11 is an axial half section of a modified embodiment of the invention.

FIGURE 12 is an enlarged section on the line 12—12 of FIGURE 11.

FIGURE 13 is a diagram plotting degrees of rotation of the output as the ordinate and plotting time as the abscissa.

FIGURE 16 is a circuit diagram illustrating one embodiment of the invention.

FIGURE 17 is a circuit diagram illustrating a still further embodiment of the invention.

Figure 1:
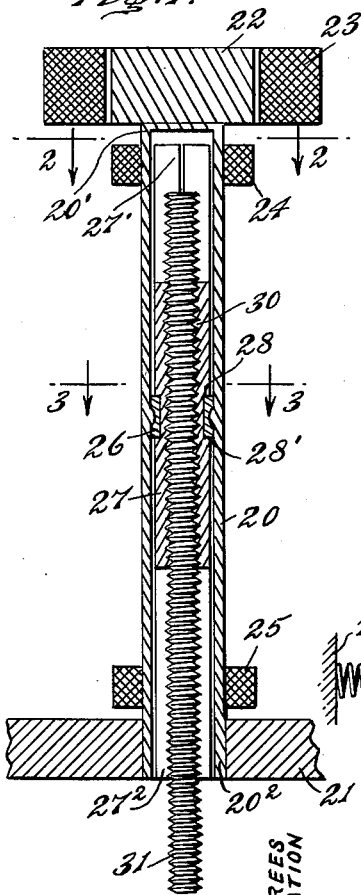
FIGURE 1 is an axial section of the preferred embodiment of the motion transmitting device of the invention.

Describing in illustration but not in limitation and referring to the drawings:

In the prior art, the transmission of motion through a sealed wall of a vessel or container is usually done by electrical induction or magnetic force, or by movement through seals or diaphragms. Seals and diaphragms are of limited utility at high pressures, and also are subject to limitation as to the amount of motion which can be transmitted. At the present time, the most satisfactory prior art devices interpose a sealed container between the stator and rotor of a motor. In order to be satisfactory, the motor must either be of very large size, or it must operate at moderate or high speed. This necessitates the use of gear reductions in many cases within the sealed container and under the atmosphere and the pressure there present. In addition, ordinary antifriction bearings are not suitable, and even the life of special bearings is limited because of the inability to lubricate, and the intrusion of foreign material into the bearings.

Many of the prior art methods of transmitting motion through a sealed wall necessitate the employment of complicated mechanisms inside the container. The problem is very complicated indeed where the content of the container is likely to cause corrosion, contamination, elevated temperature, or interference with the mechanism.

By the present invention, it is possible to transmit motion through a sealed container wall without limitation as to the character of the container material in many instances, and without great limitation in thickness. Furthermore, the device of the invention is structurally of extreme simplicity, so that elevated temperatures, corrosion, chemical reaction mixtures, elevated pressures, and other similar conditions inside the container are less likely to interfere with functioning even after prolonged service.

A further advantage of the mechanism of the invention is that it utilizes space within the container very efficiently, holding the space requirements of the mechanism itself to a minimum.

The present invention permits converting oscillating rotational motion, which is propagated in a torque tube in the form of a strain wave, into either linear or rotary motion inside a sealed wall.

The oscillation on the axis of the torque output is imposed on the torque tube at one position along its length, suitably near a closed end, while the torque tube at another position, suitably the end remote from the closed end, remains relatively stationary.

It will be understood that the torque tube will in many cases form part of the wall of a sealed container, and in some cases the entire container may be formed of the torque tube with appropriate end closures.

It will be evident that the application of the driving force may be controlled as to time by the frequency of an alternating current.

Considering first the form of FIGURES 1 to 6 inclusive, a torque tube 20 as there illustrated in fixed or anchored at 20² into a pressure wall 21 of a suitable container vessel enclosure or the like. In the preferred embodiment the torque tube will comprise a nonmagnetic metal which is suitably deflected as later explained, a suitable material being austenitic stainless steel, beryllium copper, or bronze. It will, however, be evident that in some cases where pressure relationships permit and where special resistance to attack of ingredients requires, the torque tube may be formed of an elastomer, such as polyethylene, linear polyamide (nylon), polytetrafluoroethylene, rubber or synthetic rubber.

In the form of FIGURES 1 to 6, the torque tube is interconnected with the rotor or armature 22 of an oscillatory motor of any well known type, provided with a stator or field 23. It will be evident, of course, that the device may be of the type which requires manual or automatic switching to determine the oscillatory motion of the rotor.

At a position adjacent the end of the torque tube which is connected to the rotor of the oscillatory motor, the torque tube is surrounded by the electromagnet 24 of a magnetic ratchet or clutch element, later referred to as gripping means, which as shown is physically mounted on the torque tube. Adjacent the end of the torque tube which is anchored at $20^2$, the torque tube is surrounded by the electromagnet 25 of a magnetic ratchet or clutch, later referred to as gripping means as later explained.

The torque tube at a suitable mid-point has pressed within it a journal and thrust bearing 26 which provides journal and thrust support to suitable output means including in this instance an output element or armature 27, here shown as a tube or nut, which has shoulders 28 at opposite ends of an annular reduced portion engaging the opposite ends of the journal and thrust bearing 26. For purposes of assembly it will, of course, be evident that the thrust bearing may be split or may be deformed to fit in the annular recess. Thus the output member is movable independently of the tube 20, and is free to rotate but is not permitted to move axially with respect to the torque tube.

Figure 2:
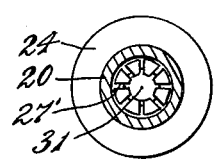
FIGURE 2 is a section on the line 2—2 of FIGURE 1.
Figure 3:
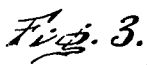
FIGURE 3 is a section on the line 3—3 of FIGURE 1.

The output element at its respective ends is split to permit radial compliance or deflection at $27'$ and $27^2$, as best seen in FIGURES 1 and 2. As the electromagnets 24 or 25 are energized, they magnetically influence the split ends of output element or armature 27 and draw these ends outwardly away from the center of the tube and towards the electromagnets until they come into intimate metal to metal contact with the torque tube 20. While the electromagnet is energized, the split end is effectively held against the inside of torque tube 20 and no relative rotational motion between the torque tube 20 and the output element 27 occurs. Of course, when the electromagnet is de-energized, the split end is no longer held against the inside of the torque tube 20. The bore of the output element has suitable internal threads 30 which engage with external threads on a linearly movable screw 31 constituting, in this case, a portion of the output means, and which makes the actual output connection with linearly moved mechanism within the vessel or container. The screw, by the interconnecting mechanism which it linearly moves, is restrained against rotation, or is otherwise splined or keyed to prevent rotation.

Any suitable manual or automatic switching means can be utilized to provide opposite ratchet action at the stationary and oscillating positions on the torque tube. Thus considering FIGURES 4 and 5, the torque tube 20 has mounted thereon at an oscillating position a switch operating abutment 33 which at opposite ends of the oscillating stroke engages a yoke-like switch operator 34 which throws the operating rocker or toggle element 35 of a switch 36 mounted on a suitable bracket not shown.

An operating circuit as shown in FIGURE 5 includes electric power leads 37 and 38. The switch 36 includes a switch operating element 40 which is open in one switch position and a switch operating element 41 which is closed in the same position. When the switch moves to the opposite limiting position, of course switch element 40 is closed and switch element 41 is open. Switch element 40 in one selecting position is in circuit with electromagnet 24 and switch element 41 in one selecting position is in circuit with electromagnet 25, each being across the power leads when the appropriate switch element is closed. A reversing switch 42 has a double throw switch element $42'$ and a double throw switch element $42^2$. In one position of the switch 42 switch element $42'$ connects to electromagnet 24 and switch element $42^2$ connects to electromagnet 25 and in another position of reversing switch 42, switch element $42'$ connects to electromagnet 25 and switch element $42^2$ connects to electromagnet 24. Thus, when the reversing switch 42 is connected in one position, the action will be to move the screw 31 in one direction and when the reversing switch is thrown in the opposite direction, the action is to move the screw in the opposite direction. For example, in one position of the switch when the oscillating armature 22 is rotating clockwise (when viewed from the top) electromagnet 24 will be energized and electromagnet 25 will be de-energized. This then will have the output 27 clutched to the top of torque tube 20 and output 27 will be rotating clockwise. Moving the reversing switch to the other position will make the output 27 clutched to the torque tube 20 while armature 22 is rotating counterclockwise and hence output 27 will move counterclockwise. The opposite oscillatory motion of armature 22 for each of the above examples will have the electromagnet 24 de-energized and the electromagnet 25 energized and no motion to armature 27 will be produced.

When the fundamental period of vibration of the oscillatory mass of FIGURE 1 is made to equal the oscillatory frequency of the motor as determined by the fundamental frequency of the power system, and they are operating in proper phase, the only power requirements are those of overcoming frictional losses and producing useful work within the container. Under this method of operation, the power lines can be connected directly to the electromagnetic clutches through appropriate rectifier circuits as shown in FIGURES 16 and 17 later described. Under these conditions, the operation during the clockwise oscillation of the armature 22 will have the electromagnet 24 energized and the electromagnet 25 de-energized in one position of the reversing switches 76 and 77 and, in the other position of the switches they will be in the position above indicated during the counterclockwise oscillation of the armature 22.

Since the frequency of clutching and of oscillations will now be synchronously controlled by the power line frequency, no power activated switches will be needed in the circuit. Reversal of direction is obtained by reversal of rectified polarity.

In operation, the armature 22 is oscillated back and forth by the stator 23 at a suitable frequency which may be the fundamental frequency of the torque tube and armature, or may be a different frequency if the oscillating motor so requires. If electromagnets 24 and 25 were both deenergized, it will of course be evident that there would be no operative connection between the input and the output and the device can thus be effectively declutched. If, however, while the torque tube is moving in one direction, electromagnet 24 is energized to cause ratchet or clutch connection between the output element and the torque tube where the torque tube is oscillating, and at the same time electromagnet 25 is deenergized so as to avoid ratchet or clutch connection between the output element and the torque tube where the torque tube is stationary, it will be evident that the output element during that half-cycle or any selected portion thereof will turn as the torque tube oscillates. If now on the reverse half-cycle electromagnet 24 is deenergized to prevent ratchet or clutch interconnection between the oscillating torque tube and the output element while the torque tube moves back to the beginning of the next cycle, and electromagnet 25 is energized to obtain ratchet or clutch connection between the tube element and the torque tube where the torque tube is stationary, it will be evident that there will be no tendency to cause reverse motion of the torque tube and all of the forward motion on the first half of the cycle will be a net gain.

It will further be evident that by reversing the times at which electromagnets 24 and 25 are respectively energized and deenergized, the motion of the output element can be produced in the opposite direction. Thus, power can be transmitted and adjustments can be made as desired by simply manipulating the switch 42 in FIGURE 5.

It will of course also be evident that if motion is to taken place only during a portion of the oscillation any desired amount of lost motion can be included in the switching mechanism of FIGURE 4.

It will of course be evident that the illustration of the expanding split portions to accomplish the ratchet clutching function is merely diagrammatic and any desired refinement in electromagnetic clutches may be used in the form of FIGURES 1 to 6.

Figure 6:
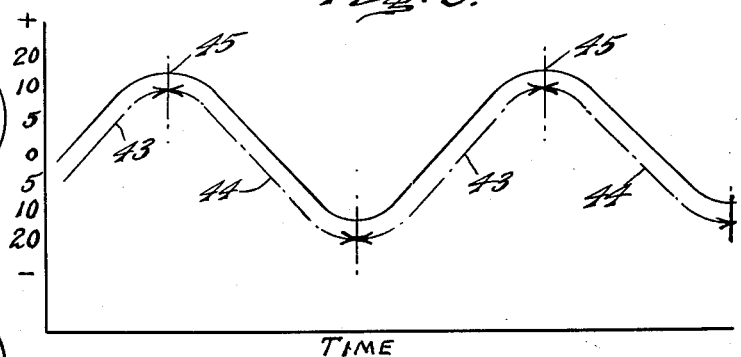
FIGURE 6 is a diagram plotting rotation in degrees of the oscillating operation of the torque tube as the ordinate and time as the abscissa.

FIGURE 6 shows in the ordinate the motion of the oscillating end of the torque tube in degrees±with respect to a neutral position. A clockwise rotation of the torque tube when viewed from the oscillating end of the tube is designated a plus direction and a counterclockwise rotation of the tube is designated a minus direction. The wave form as illustrated is essentially a sine wave. To obtain movement of the output element in a clockwise direction, the output tube is clamped to the torque tube where the torque tube is oscillating over the range 43, but is clamped to the torque tube where the torque tube is stationary over the range 44. Whenever the output element is clamped at the oscillating position of the torque tube, it is released at the stationary position, and whenever it is clamped at the stationary position, it is released at the oscillating position.

To obtain movement of the output element in a counterclockwise direction, the output element is clamped to the torque tube where the torque tube is oscillating over the range 44, but is clamped to the torque tube where the torque tube is stationary over the range 43.

While it will be noted that the particular example in FIGURE 6 illustrates an oscillating range of ±20 degrees at the position of maximum oscillation, it will be understood of course that any desired range of oscillation of the torque tube may be used, and the range of oscillation may be made adjustable if desired. Whenever the output element is clamped to the torque tube where the torque tube is oscillating, there will be productive output movement which in the form of FIGURES 1 to 6 is linear movement of the output screw 31.

The shape of the wave in FIGURE 6 is simple harmonic motion, and it will be evident that the clutches can be made to engage and disengage when the torque tube at the oscillating end 20' is standing still or at the crest of the wave 45.

In some cases it may be desirable to employ a relatively heavy rotor 22 or a flywheel rotor 22 or to add greatly to the mass of the armature or rotor 22, with a view to reducing the frequency of oscillation which would otherwise be produced.

It will also be understood that the oscillating motor can be made to change its frequency of oscillation by well known electrical means such as variation of the frequency of the alternating current supplied to the stator, by phasing-in through auxiliary pickups, or by controlling limit switching which energizes and deenergizes the coils as the rotor oscillates, all as well known in the art.

It will also be evident that any desired limit on the amplitude of oscillation of the torque tube can be imposed as by stops or by inherent range of oscillation of the oscillating motor, to prevent overstressing the torque tube.

It will thus be evident that the frequency can be made fast or slow, and the oscillation amplitude can be made large or small, and clutching can occur during all or any part of the stroke, while of course the pitch of the output screw 31 can be made fast or slow.

It will be evident that the device of the invention can be used effectively to transmit very considerable amounts of power.

In some cases it is preferable to oscillate the torque tube at 20' by mechanical means. In FIGURE 7, I illustrate a torque tube 20 which is oscillated by shaft 46 on which is keyed crank 47 pivotally connected at 48 to connecting rod 50 which pivotally connects at 51 to crank arm 52 on the torque tube 20 at 20'. In this case, of course, suitable adjustment of the lengths of the crank arms and the length of the connecting rod can determine the oscillating amplitude and the speed of the shaft 46 determines the oscillating frequency.

In some cases it will be preferable to utilize other suitable means to oscillate the torque tube, and it will be evident that it is immaterial to the broad aspects of the invention whether the torque tube is oscillated by electrical mechanism, hydraulic, pneumatic or other means.

In some cases instead of magnetic clutches, mechanical ratchets will be preferred as shown in the form of FIGURES 8 to 10 inclusive. In this form the torque tube 20 is oscillated by means not shown and suitably journalled therein is a rotating tube element $27^3$ and flanges $27^4$ which are keyed to a rotating output shaft 53 at 53' and $53^2$. At the oscillating end the torque tube carries pivotal oscillating pawls 54 which in one direction of rotation engage and in the other direction of rotation release with respect to ratchet wheel 55 on the output element $27^3$. This ratchet wheel and pawl connection therefore accomplishes the driving connection to the output. At the end of the output element $27^3$, adjoining the anchorage of the torque tube, stationary pawls 56 on the container engage ratchet wheel 57 in the direction of motion opposite to the engagement at ratchet wheel 55 and release in the direction at which pawl 54 engages ratchet wheel 55.

Thus in effect by mechanical means the ratchets at 55 and 57, later referred to as gripping means, accomplish in FIGURES 8 to 10 what the clutches accomplish in FIGURES 1 to 6.

The form of FIGURES 8 to 10 has the advantage that it provides rotary output rather than linear output and in some cases this will be preferred.

In certain instances the intermittent character of the motion of the forms just described may be less desirable, and in FIGURES 11 and 12 I illustrate a form which provides a continuous although variant motion as shown in FIGURE 13. Here the torque tube 20 at the top where it is oscillating has pawls 54 which engage in one direction ratchet teeth 55 on rotary output element $27^5$. The stationary end of the torque tube mounts a bracket 60 which at a position intermediate the stationary and oscillating end pivotally connects at 61 with a mid-point on lever 62 which at the oscillating end pivotally connects with the torque tube at 63. At the opposite end, the lever 62 pivotally connects at 64 with a ring ratchet gear 65 which surrounds and journals on the tube $27^5$ and whose ratchet teeth 65' engage pawls 66 positioned on flange 67 of the output element $27^5$.

In the operation of the device of FIGURE 11, it will be evident that on the one half-cycle where the pawl 54 engages the ratchet 55 at the top in FIGURE 11 there is transmission of output directly to the output element. On the other half-cycle where the pawl 54 is disengaged, the oscillation transmits motion through pivotal connection 63 to lever 62 and the opposite end of the lever through pivotal connection 64 moves ratchet gear 65 whose ratchet teeth 65' on that half-cycle engage pawl 66 and turn the flange 67 of output element $27^5$. Whenever pawl 54 is engaged with ratchet teeth 55, pawl 66 is released from ratchet teeth 65' and vice versa. The ratchet mechanism is referred to later as gripping means.

It will of course be evident that there may be as many of the levers 62 distributed around the circumference as desired in order to transmit the load.

It will be evident that the device of FIGURES 11 to 13 in effect transmits full wave motion.

Figure 14:
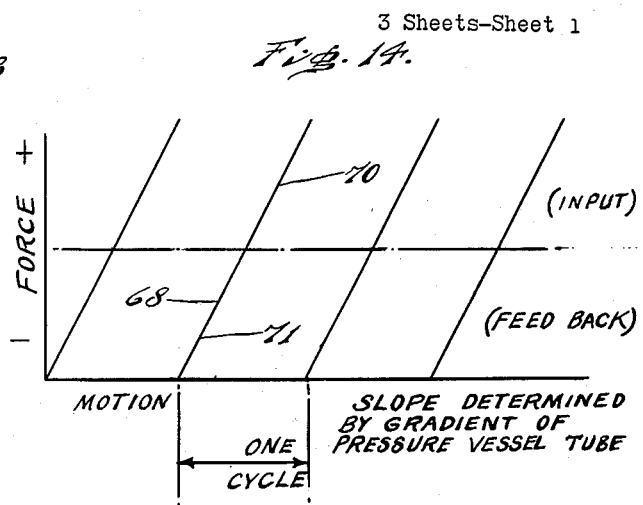
FIGURE 14 is a diagram plotting force as the ordinate and plotting motion as the abscissa.

It will of course be understood that where conditions of pressure, heat, humidity, fluid level or character of content dictate, the control mechanism can be located inside the pressure vessel, in which case of course the entire ratchet or clutch construction used will desirably be placed on the inside. If the torque tube is driven at an oscillating frequency other than the fundamental, then the force application becomes discontinuous as shown in FIGURE 14. Here, increments of force application are shown at 68, with input over the range 70 and feedback over the range 71. The slope of the lines 68 is determined by the gradient of the torque tube.

Figure 15:
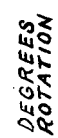
FIGURE 15 is a top plan view of a variant embodiment of the invention illustrating spring biasing to neutral position.

In some cases the load diagram resulting may not be the optimum. In such cases this can be altered by spring loading or biasing the torque tube away from a neutral position toward a limiting position, thus producing in effect a reverse gradient. Thus, as shown in FIGURE 15, the torque tube is provided with diametrally extending spring abutments 72 which interconnect with the ends of helical compression springs 73, the opposite ends of which rest against spring abutments 74. The neutral position is the solid line position and when the torque tube moves to the dot-and-dash line position in one direction it is biased toward the motion in that direction by the compression springs. Likewise when oscillation occurs in the reverse direction, the compression springs bias toward motion in that direction. The spring 73 is compressed from a position indicated by the dot-and-dash lines to a position indicated by the solid lines and then connected to the torque tube 20 in neutral position by the diametrically extending spring abutments 72.

By proper choice of the lengths of the spring abutment arms 72' with respect to the spring gradient a reasonable reverse gradient can be produced which will tend to cancel the gradient of the torque tube. Under these conditions, when there is no load on the internally driven parts, the only power requirement will be to overcome friction in the system.

In FIGURE 16, I illustrate alternating current power leads 75, suitably at commercial frequency, which are connected in parallel to the magnetic clutches 24 and 25 respectively through reversing switches 76 and 77, each of which has two positions, one of which positions connects through rectifiers 78 and 80 and the other of which positions connects through opposed rectifiers 81 and 82. The switches 76 and 77 are interconnected and operated manually or automatically to control direction, and in any position of the switches, only one of the rectifiers which is connected is conducting.

It will be evident that the period of oscillation of the device of FIGURE 16 will be determined by the particular alternating current frequency impressed. Since each of the rectifiers will operate through one half of the power cycle they will be operating synchronously with the oscillation.

FIGURE 17 shows an arrangement which accomplishes a purpose similar to that of FIGURE 16, but uses grid control thyratrons, which have primary control of motion amplitude by controlling the level of voltage at which the thyratrons conduct by adjusting the grid bias. In this case, the power lines 75 are connected in parallel to the respective magnetic clutches 24 and 25 through the anodes and cathodes of thyratrons 83 and 84 positioned as shown. A biasing resistor 85 across the line has taps 86 and 87 connected to the respective control grids. The tubes are gas filled. It will be evident that in any position of the alternating current cycle, only one of the rectifier tubes is conducting.

In view of my invention and disclosure variations and modifications to meet individual whim or particular need will doubtless become evident to others skilled in the art to obtain all or part of the benefits of my invention without copying the structure shown, and I, therefore, claim all such insofar as they fall within the reasonable spirit and scope of my claims.

Having thus described my invention, what I claim as new and desire to secure by Letters Patent is:

1. In a device for transmitting motion through a relatively stationary wall having an opening therethrough, a torque tube having axially spaced open and closed portions, said open portion being anchored to the wall, and the inside of said torque tube communicating through the wall opening, power input responsive drive means torsionally oscillating said closed portion of the torque tube in response to power input, output means freely movable within said torque tube relative to said tube and extending between said closed and open portions of the tube, coupling means interengaging the torsionally oscillating torque tube and said output means for unidirectional movement of said tube to operate said output means during a half-cycle of each cycle of oscillation of said tube and disengaging the tube and output means during the other half-cycle of each cycle of oscillation of the tube, and means inhibiting reversed operation of said output means in said other half-cycle of each cycle of oscillation of said tube.

2. A device of claim 1, in which said output means inhibited by said inhibiting means, in said other half-cycle of each cycle of oscillation of said tube, occupies a substantially fixed position relative to said wall.

3. A device of claim 1, in which said output means, in being inhibited against said reversed operation by said inhibiting means, is so operably engaged with said oscillating torque tube by said inhibiting means, during said other half-cycle of each cycle of oscillation of the tube, that said output means is driven by the tube and operates directionally the same as during said half-cycles of oscillation of the tube wherein said output means is operably engaged with the tube by said coupling means.

4. A device of claim 1, in combination with means for spring biasing the torque tube away from neutral position when the torque tube is oscillated.

5. A device of claim 1, in which a portion of said output means is adapted to be moved in the tube with relative linear translatory motion.

6. A device of claim 1, in which said output means includes a nut in combination with a screw threaded in said nut.

7. A device of claim 1, in which said output means comprises a nut in combination with a journal and thrust bearing operatively interposed between the torque tube and the output means and a screw threaded in the nut.

8. In a device for transmitting motion through a relatively sationary wall having an opening therethrough, a torque tube having axially spaced open and closed portions, said open portion being anchored to the wall, and the inside of said tube communicating through the wall opening, power input responsive drive means torsionally oscillating said closed portion of the tube in response to power input, output means within said tube and extending between said closed and open portions of the tube, a first one-way coupling interengaging said torque tube and said output means adjacent to said closed portion of the tube during first alternate half-cycles of oscillation of said torque tube and freeing said output means and torque tube during second alternate half-cycles of oscillation of said torque tube, a second one-way coupling operatively connected with said output means, and a lever pivotally connected respectively with said torque tube and with said second one-way coupling and having an intermediate pivot fixed with respect to the wall, for said drive means to act in the same direction of drive of said output means through said first one-way coupling as through said lever and said second one-way coupling.

9. In a device for transmitting motion through a relatively stationary wall having an opening therethrough, a torque tube having axially spaced open and closed portions, said open portion being anchored to the wall, and the inside of said tube communicating through the wall opening, power input responsive drive means torsionally oscillating said closed portion of the tube in response to power input, output means within said tube and extending between said closed and open portions of the tube, first gripping means holding said output means in relatively stationary position with respect to the wall during first alternate half-cycles of oscillation of said torque tube and relatively releasing said output means for movement with respect to the wall during second alternate half-cycles of oscillation of said torque tube, and second gripping means coupling said torque tube and said output means together adjacent to said closed portion of the tube during said second alternate half-cycles of oscillation of said torque tube for drive of said drive means to be transmitted to said output means, said second gripping means relatively uncoupling said output means from said drive means during said first alternate half-cycles of oscillation of said torque tube.

10. A device of claim 9, in which said first gripping means comprises first clutch means effecting interengagement between said output means and said torque tube, and in which said second gripping means comprises second clutch means effecting interengagement between said torque tube and said output means.

11. A device of claim 9, in which said first gripping means comprises first magnetic clutch means maintaining said output means in said relatively stationary position with respect to the wall during said first alternate half-cycles of oscillation of said torque tube, and in which said second gripping means comprises second magnetic clutch means coupling said torque tube and the output means during said second alternate half-cycles of oscillation of said torque tube.

12. A device of claim 9, in combination with means for operating said first and second gripping means alternately in timed relation to alternating current controlling said driving means.

13. A device of claim 9, in combination with means for reversing the phase relation between said first gripping means and said second gripping means with respect to the oscillation of said torque tube.

References Cited in the file of this patent

UNITED STATES PATENTS

| | | |
|---|---|---|
| 2,299,315 | Evans | Oct. 20, 1942 |
| 2,509,227 | Gordy | May 30, 1950 |

FOREIGN PATENTS

| | | |
|---|---|---|
| 500,315 | Italy | Nov. 18, 1954 |
| 561,029 | Belgium | Oct. 15, 1957 |